(12) United States Patent
Li

(10) Patent No.: US 11,529,975 B2
(45) Date of Patent: Dec. 20, 2022

(54) METHOD, APPARATUS AND SYSTEM FOR CONTROLLING AUTOMATED GUIDED VEHICLE

(71) Applicants: Beijing Jingdong Shangke Information Technology Co., Ltd., Beijing (CN); Beijing Jingdong Century Trading Co., Ltd., Beijing (CN)

(72) Inventor: Liang Li, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 150 days.

(21) Appl. No.: 17/044,216

(22) PCT Filed: May 6, 2019

(86) PCT No.: PCT/CN2019/085640
§ 371 (c)(1),
(2) Date: Sep. 30, 2020

(87) PCT Pub. No.: WO2019/237851
PCT Pub. Date: Dec. 19, 2019

(65) Prior Publication Data
US 2021/0155271 A1    May 27, 2021

(30) Foreign Application Priority Data
Jun. 11, 2018    (CN) .......................... 201810593981.3

(51) Int. Cl.
*B60W 60/00*      (2020.01)
*B60W 50/02*      (2012.01)
(Continued)

(52) U.S. Cl.
CPC .. *B60W 60/00256* (2020.02); *B60W 50/0205* (2013.01); *B60W 50/0225* (2013.01);
(Continued)

(58) Field of Classification Search
CPC ......... B60W 50/0205; B60W 50/0225; B60W 60/00256; G08G 1/20
See application file for complete search history.

(56) References Cited

U.S. PATENT DOCUMENTS 8,027,750 B2    9/2011   Orita et al.
9,429,951 B2    8/2016   Kazama et al.
(Continued)

FOREIGN PATENT DOCUMENTS

CN    205692048 U    11/2016
CN    106873605 A    6/2017
(Continued)

OTHER PUBLICATIONS

International Search Report for PCT/CN2019/085640, dated Aug. 6, 2019, 3 pages.

*Primary Examiner* — Alan D Hutchinson
*Assistant Examiner* — Andy Schneider
(74) *Attorney, Agent, or Firm* — Blank Rome LLP

(57) ABSTRACT

A method, apparatus, and system for controlling an automated guided vehicle. An embodiment of the method comprises: receiving a fault message comprising travel state information for indicating the travel state of a faulty automated guided vehicle and position information of a fault point where a fault occurs (201); determining a fault region, and sending an instruction for indicating prohibition of passing in the fault region to a non-faulty automated guided vehicle (202); determining a target automated guided vehicle from the automated guided vehicles currently not executing a task, and sending a task execution instruction to
(Continued)

the target automated guided vehicle (203); and in response to determining that the faulted automated guided vehicle is transferred to a maintenance region, sending an instruction for indicating cancel of the prohibition of passing in the fault region to the non-faulty automated guided vehicle that is executing a task (204).

17 Claims, 7 Drawing Sheets

(51) Int. Cl.
*G08G 1/00* (2006.01)
*G05B 15/02* (2006.01)

(52) U.S. Cl.
CPC ............... *G05B 15/02* (2013.01); *G08G 1/20* (2013.01); *G08G 1/22* (2013.01)

(56) References Cited

U.S. PATENT DOCUMENTS

| | | | |
|---|---|---|---|
| 9,651,950 | B2 | 5/2017 | Jang et al. |
| 2012/0330491 | A1 | 12/2012 | Olinger et al. |
| 2016/0124434 | A1* | 5/2016 | Gariepy ............... G05D 1/0297 701/23 |

FOREIGN PATENT DOCUMENTS

| | | |
|---|---|---|
| CN | 107368072 A | 11/2017 |
| CN | 107422729 A | 12/2017 |
| CN | 207457830 U | 6/2018 |
| JP | H-01274215 A | 11/1989 |
| JP | H-0322111 A | 1/1991 |
| JP | 2004252631 A | 9/2004 |
| JP | 2006106919 A | 4/2006 |
| JP | 2009028831 A | 2/2009 |
| JP | 2014059860 A | 4/2014 |
| WO | WO-2015059739 A1 | 4/2015 |

\* cited by examiner

US 11,529,975 B2

METHOD, APPARATUS AND SYSTEM FOR CONTROLLING AUTOMATED GUIDED VEHICLE

The present application is a U.S. National Phase Application of International Application No. PCT/CN2019/085640 filed May 6, 2019, which claims priority to Chinese Patent Application No. "201810593981.3" filed on Jun. 11, 2018, the entire contents of which are incorporated herein as a whole.

TECHNICAL FIELD

Embodiments of the present disclosure relate to the field of computer technology, specifically to a method, apparatus and system for controlling an automated guided vehicle.

BACKGROUND

Automated Guided Vehicle (AGV), also known as unmanned vehicle, refers to a vehicle equipped with an electromagnetic or optical automated guided apparatus, capable of driving along a prescribed guiding path, and has safety protection and various transfer functions. The automated guided vehicle may inevitably have abnormalities during driving. For some faults, they may be solved by restarting or restoring tasks. However, for some other faults, it is usually impossible to handle them in a short time, so it is necessary to continue to perform the un completed task of the faulty vehicle by changing a vehicle.

When it is found that there is a faulty automated guided vehicle in a warehouse, and the fault cannot be handled in a short time, the existing method is to first push the faulty automated guided vehicle out of the field, then manually dispatch a non-faulty automated guided vehicle to the maintenance area, modify the attribute (such as serial number, or IP (Internet Protocol) address) of the non-faulty automated guided vehicle to the attribute of the faulty automated guided vehicle, restart the non-faulty automated guided vehicle, resume the task, so that the non-faulty automated guided vehicle replaces the faulty automated guided vehicle to complete the task.

SUMMARY

Embodiments of the present disclosure propose a method, apparatus and system for controlling an automated guided vehicle.

In a first aspect, some embodiments of the present disclosure provide a method for controlling an automated guided vehicle. The method includes: receiving a fault message, the fault message comprising travel status information for indicating a travel status of a faulty automated guided vehicle and location information of a fault point where a fault occurs; determining a fault area based on the location information, and sending an instruction for instructing prohibition of traffic in the fault area to a non-faulty automated guided vehicle executing a task; determining a target automated guided vehicle from automated guided vehicles currently not executing tasks based on the travel status information, and sending a task execution instruction to the target automated guided vehicle, the task execution instruction comprising an instruction for instructing to execute a target task, and the target task being a task that has not been completed by the faulty automated guided vehicle; and in response to determining that the faulty automated guided vehicle is transferred to a maintenance area, sending an instruction for instructing to cancel the prohibition of traffic in the fault area to the non-faulty automated guided vehicle executing the task.

In some embodiments, the determining the target automated guided vehicle from the automated guided vehicles currently not executing the tasks based on the travel status information, and sending the task execution instruction to the target automated guided vehicle, comprises: in response to determining that the travel status indicated by the travel status information is an item-fetching status, determining a location of a storage space of an item to be fetched by the faulty automated guided vehicle; and determining an automated guided vehicle closest to the location of the storage space of the item in the automated guided vehicles currently not executing the tasks as the target automated guided vehicle, and sending the task execution instruction to the target automated guided vehicle, wherein the task execution instruction comprises the instruction for instructing to execute the target task, and the target task is the task that has not been completed by the faulty automated guided vehicle.

In some embodiments, the determining the target automated guided vehicle from the automated guided vehicles currently not executing the tasks based on the travel status information, and sending the task execution instruction to the target automated guided vehicle, comprises: in response to determining that the travel status indicated by the travel status information is an item-delivering status, determining an automated guided vehicle closest to the fault point in the automated guided vehicles currently not executing the tasks as the target automated guided vehicle, and sending the task execution instruction to the target automated guided vehicle, wherein the task execution instruction comprises an instruction for instructing driving to a location of the fault point and the instruction for instructing to execute the target task, and the target task is the task that has not been completed by the faulty automated guided vehicle.

In some embodiments, after sending the task execution instruction to the target automated guided vehicle, the method further comprises: sending a task stop instruction to the faulty automated guided vehicle to stop the task being performed by the faulty automated guided vehicle.

In some embodiments, after sending the task execution instruction to the target automated guided vehicle, the method further comprises: clearing the travel status information of the faulty automated guided vehicle.

In a second aspect, some embodiments of the present disclosure provide an apparatus for controlling an automated guided vehicle, comprising: a receiving unit, configured to receive a fault message, the fault message comprising travel status information for indicating a travel status of a faulty automated guided vehicle and location information of a fault point where a fault occurs; a first sending unit, configured to determine a fault area based on the location information, and send an instruction for instructing prohibition of traffic in the fault area to a non-faulty automated guided vehicle executing a task; a determination unit, configured to determine a target automated guided vehicle from automated guided vehicles currently not executing tasks based on the travel status information, and send a task execution instruction to the target automated guided vehicle, the task execution instruction comprising an instruction for instructing to execute a target task, and the target task being a task that has not been completed by the faulty automated guided vehicle; and a second sending unit, configured to send an instruction for instructing to cancel the prohibition of traffic in the fault area to the non-faulty automated guided vehicle executing the task, in response to determining that the faulty automated guided vehicle is transferred to a maintenance area.

In some embodiments, the determination unit comprises: a determination module, configured to determine a location of a storage space of an item to be fetched by the faulty automated guided vehicle, in response to determining that the travel status indicated by the travel status information is an item-fetching status; and a first sending module, configured to determine an automated guided vehicle closest to the location of the storage space of the item in the automated guided vehicles currently not executing the tasks as the target automated guided vehicle, and send the task execution instruction to the target automated guided vehicle, wherein the task execution instruction comprises the instruction for instructing to execute the target task, and the target task is the task that has not been completed by the faulty automated guided vehicle.

In some embodiments, the determination unit comprises: a second sending module, configured to determine an automated guided vehicle closest to the fault point in the automated guided vehicles currently not executing the tasks as the target automated guided vehicle, and send the task execution instruction to the target automated guided vehicle, in response to determining that the travel status indicated by the travel status information is an item-delivering status, wherein the task execution instruction comprises an instruction for instructing driving to a location of the fault point and the instruction for instructing to execute the target task, and the target task is the task that has not been completed by the faulty automated guided vehicle.

In some embodiments, the apparatus further comprises: a third sending unit, configured to send a task stop instruction to the faulty automated guided vehicle to stop the task being performed by the faulty automated guided vehicle.

In some embodiments, the apparatus further comprises: a setting unit, configured to clear the travel status information of the faulty automated guided vehicle.

In a third aspect, some embodiments of the present disclosure provide a system for controlling an automated guided vehicle, the system comprising a server and at least one automated guided vehicle, each of the at least one automated guided vehicle being in communication connection with the server; the server, is configured to receive a fault message, determine a fault area based on location information of a fault point, a fault of a faulty automated guided vehicle in the at least one automated guided vehicle occurred at the fault point, the fault message comprising travel status information for indicating a travel status of the faulty automated guided vehicle and the fault information; a non-faulty automated guided vehicle executing a task in the at least one automated guided vehicle, being configured to receive an instruction for instructing prohibition of traffic in the fault area sent by the server; and the server, being further configured to determine a target automated guided vehicle from automated guided vehicles currently not executing tasks based on the travel status information, and send a task execution instruction to the target automated guided vehicle, the task execution instruction comprising an instruction for instructing to execute a target task, and the target task being a task that has not been completed by the faulty automated guided vehicle, and send an instruction for instructing to cancel the prohibition of traffic in the fault area to the non-faulty automated guided vehicle executing the task, in response to determining that the faulty automated guided vehicle is transferred to a maintenance area.

In some embodiments, the system further comprises a terminal device, and the terminal device is in communication connection with the server; and the terminal device, is configured to send the fault message to the server, wherein the fault message comprises the travel status information for indicating the travel status of the faulty automated guided vehicle and the location information of the fault point where the fault occurs.

In some embodiments, the server is further configured to: determine a location of a storage space of an item to be fetched by the faulty automated guided vehicle, in response to determining that the travel status indicated by the travel status information is an item-fetching status; and determine an automated guided vehicle closest to the location of the storage space of the item in the automated guided vehicles currently not executing the tasks as the target automated guided vehicle, and send the task execution instruction to the target automated guided vehicle, wherein the task execution instruction comprises the instruction for instructing to execute the target task, and the target task is the task that has not been completed by the faulty automated guided vehicle.

In some embodiments, the server is further configured to: in response to determining that the travel status indicated by the travel status information is an item-delivering status, determine an automated guided vehicle closest to the fault point in the automated guided vehicles currently not executing the tasks as the target automated guided vehicle, and send the task execution instruction to the target automated guided vehicle, wherein the task execution instruction comprises an instruction for instructing driving to a location of the fault point and the instruction for instructing to execute the target task, and the target task is the task that has not been completed by the faulty automated guided vehicle.

In some embodiments, the server is further configured to: send a task stop instruction to the faulty automated guided vehicle to stop the task being performed by the faulty automated guided vehicle, after the send the task execution instruction to the target automated guided vehicle.

In some embodiments, the server is further configured to: clear the travel status information of the faulty automated guided vehicle.

In a fourth aspect, some embodiments of the present disclosure provide a server, the server includes: one or more processors; and a storage apparatus, storing one or more programs thereon, the one or more programs, when executed by the one or more processors, cause the one or more processors to implement the method for controlling an automated guided vehicle according to any one of the embodiments in the first aspect.

In a fifth aspect, some embodiments of the present disclosure provide a computer readable medium, storing a computer program thereon, the program, when executed by a processor, the method for controlling an automated guided vehicle according to any one of the embodiments in the first aspect is executed.

The method, apparatus and system for controlling an automated guided vehicle provided by embodiments of the present disclosure, first receive the fault message when the automated guided vehicle fails; then determine the fault area based on the location of the fault point, to prohibit the traffic of the non-faulty automated guided vehicle performing a task in the fault area; determine the target automated guided vehicle from the automated guided vehicles currently not performing tasks, based on the travel status information of the faulty automated guided vehicle, so that the determined target automated guided vehicle performs the task that has not been completed by the faulty automated guided vehicle; and finally send the instruction for instructing to cancel the prohibition of traffic in the fault area to the automated guided vehicle, after the faulty automated guided vehicle is transferred to the maintenance area. Therefore, after the automated guided vehicle fails, it is not necessary to manually dispatch the target automated guided vehicle and manually modify the attributes, which reduces the complexity and difficulty of fault handling, and improves the efficiency of handling a fault event. At the same time, the automated guided vehicle is controlled to prohibit the traffic in the fault area, and the prohibition of traffic of the automated guided vehicle in the fault area is cancelled, and it is not necessary to stop traveling of the automated guided vehicle performing a task after the fault occurs, realizing a flexible control of the automated guided vehicle performing a task.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
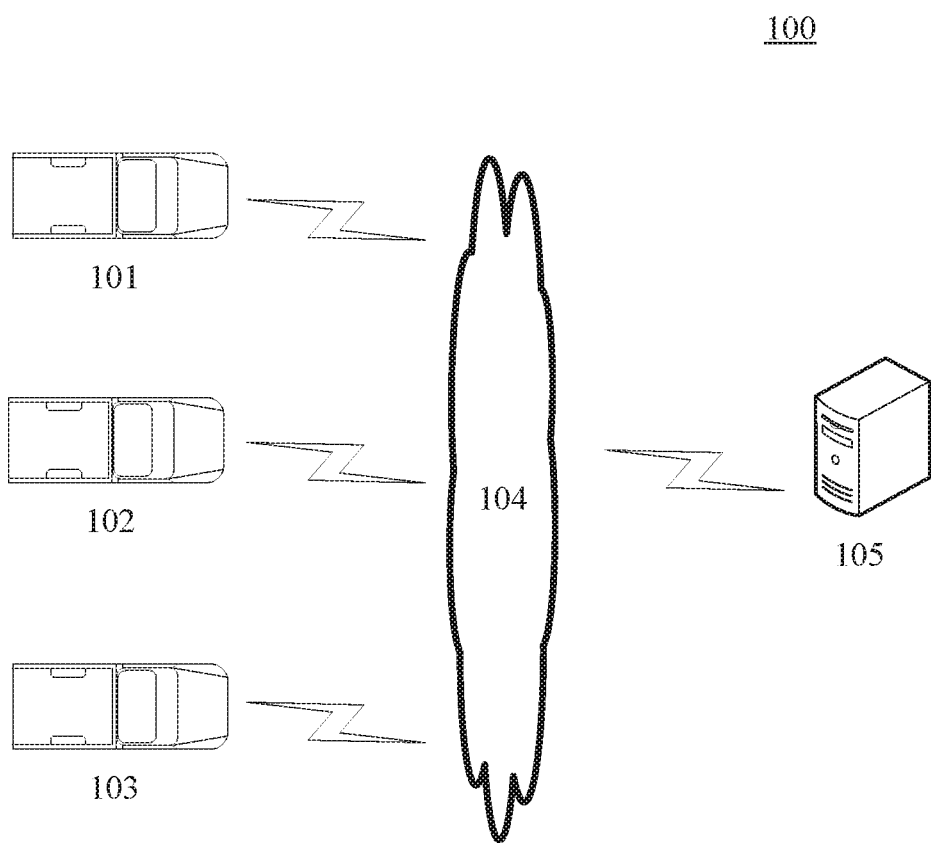
FIG. 1 is a diagram of an exemplary system architecture in which embodiments of the present disclosure may be implemented.

FIG. 1 illustrates an exemplary system architecture 100 of a method for controlling an automated guided vehicle or an apparatus for controlling an automated guided vehicle in which embodiments of the present disclosure may be implemented.

As shown in FIG. 1, the system architecture 100 may include: automated guided vehicles 101, 102, and 103, a network 104 and a server 105. The network 104 is used to provide a communication link medium between the automated guided vehicles 101, 102, and 103 and the server 105. The network 104 may include various types of connections, such as wired, wireless communication links, or optic fibers.

The automated guided vehicles 101, 102 and 103 interact with the server 105 through the network 104 to receive an instruction (for example, an instruction for instructing prohibition of traffic in the above fault area) or send a message (for example, information of a fault) or the like.

The server 105 may be a server that provides various services, for example, a control server that controls the automated guided vehicles 101, 102, and 103. The control server may dispatch the automated guided vehicles to perform operations, and send instructions to the automated guided vehicles to control the automated guided vehicles to perform tasks and prohibit an automated guided vehicle from traveling in the fault area.

It should be noted that the server may be hardware or software. When the server is hardware, it may be implemented as a distributed server cluster composed of a plurality of servers, or as a single server. When the server is software, it may be implemented as a plurality of software or software modules (for example, a plurality of software or software modules for providing distributed services) or as a single software or software module, which is not specifically limited herein.

It should be noted that the system architecture 100 may also include a terminal device (not shown in the figure). The terminal device may respectively communicate with the server 105 through the network. In the case where the automated guided vehicles 101, 102, 103 encounter battery failure or unable to start, etc., those skilled in the art may use the terminal device to send the fault information to the server 105.

It should be noted that the method for controlling an automated guided vehicle provided by the embodiments of the present disclosure is generally performed by the server 105. Accordingly, the apparatus for controlling an automated guided vehicle is generally disposed in the server 105.

It should be understood that the number of automated guided vehicles, networks and servers in FIG. 1 is merely illustrative. Depending on the implementation needs, there may be any number of automated guided vehicles, networks and servers.

Figure 2:
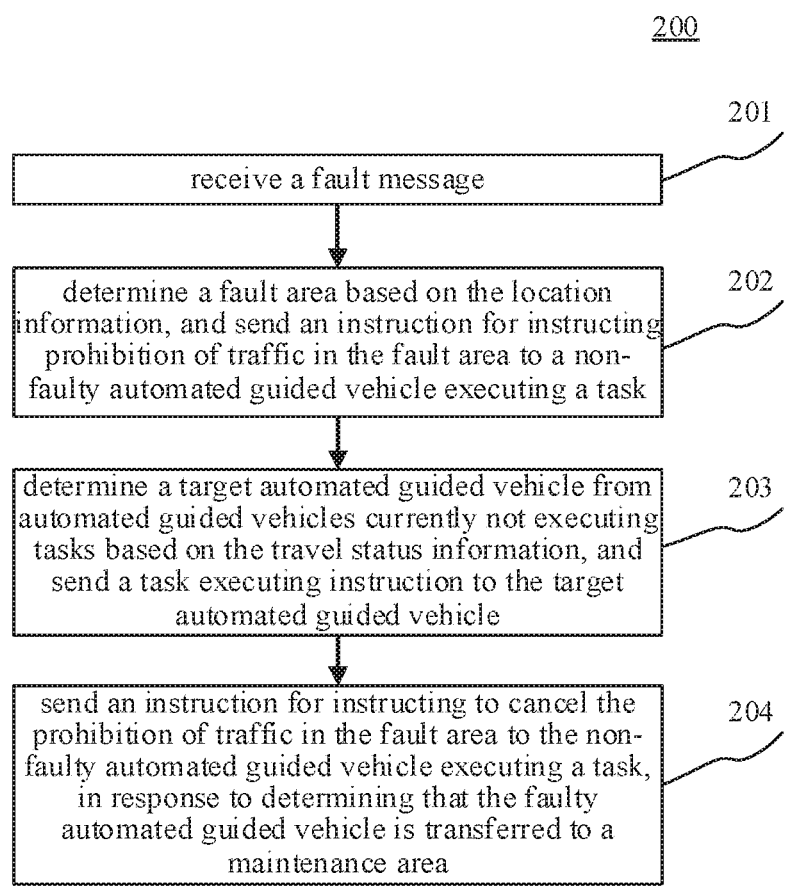
FIG. 2 is a flowchart of a method for controlling an automated guided vehicle according to an embodiment of the present disclosure.

With further reference to FIG. 2, a flow 200 of a method for controlling an automated guided vehicle according to an embodiment of the present disclosure is illustrated. The method for controlling an automated guided vehicle includes the following steps:

Step 201, receiving a fault message.

In the present embodiment, the executing body (for example, the server 105 shown in FIG. 1) of the method for controlling an automated guided vehicle may receive the fault message. The fault message may include travel status information for indicating a travel status of a faulty automated guided vehicle and location information of a fault point (for example, the coordinates of the fault point). Here, the travel status of the faulty vehicle may include, but is not limited to, an item-fetching status and an item-delivering status. In practice, when the automated guided vehicle is in the item-fetching status, the body does not carry an item; and when the automated guided vehicle is in the item-delivering status, the body carries an item. The item here may be a shelf, goods, and the like. When the item is a shelf, the shelf may or may not carry goods. The shelf may be a single-layer shelf or a multi-layer shelf, which is not limited herein.

In one scenario, the fault information is sent by the faulty automated guided vehicle to the executing body when the faulty automated guided vehicle detects its own abnormality. Here, the automated guided vehicle may automatically detect its own abnormality. For example, battery power may be periodically checked, and when it is detected that the battery power is less than a preset minimum power, it is determined that the battery is abnormal.

In another scenario, the faulty automated guided vehicle cannot detect its own abnormality due to battery failure, unable to start, and other reasons. In this regard, a warehouse manager or those skilled in the art may manually set fault information using a terminal device, and use the terminal device to send the fault information to the executing body.

Step 202, determining a fault area based on the location information, and sending an instruction for instructing prohibition of traffic in the fault area to a non-faulty automated guided vehicle executing a task.

In the present embodiment, the executing body may first determine the fault area based on the location information, and then send the instruction for instructing the prohibition of traffic in the fault area to a non-faulty automated guided vehicle performing the task. Here, the executing body may determine the fault area through the following steps. First, a locating point closest to the location of the fault point may be determined, and the locating point may be used as a central locating point. In practice, the locating point may be the center of a two-dimensional code drawn in advance on the ground. Each two-dimensional code may store the coordinates of the center position of the two-dimensional code (that is, the coordinates of the locating point), serial number of the locating point, and other information. Then, a preset range with the central locating point as the center may be determined as the fault area. For example, the preset range may be a circular range composed of the central locating point as the center and a preset length as the radius. As another example, the preset range may be a rectangular range composed of the central locating point as the center and a preset length as the length and width. As another example, the preset range may also be a range determined by a preset number of locating points surrounding the central locating point as the center (for example, 25 locating points including the above central locating point). In practice, the 25 locating points may be distributed in 5 rows and 5 columns, and the locating points are all located at the intersections of the rows and columns. The central locating point is the intersection of the third row and the third column. It may connect the adjacent locating points in the first row in a straight line, the adjacent locating points in the first column in a straight line, the adjacent locating points in the fifth row in a straight line, and the adjacent locating points in the fifth column in a straight line, respectively. In this regard, a formed closed rectangular area may be used as the preset range.

In practice, after sending the instruction for instructing the prohibition of traffic in the fault area to a non-faulty automated guided vehicle performing a task, the staff may transfer the faulty automated guided vehicle to the fault area. After receiving the instruction, each non-faulty automated guided vehicle that currently is performing a task may re-plan a route to avoid traveling to the fault area. If there is no new route that may avoid traveling to the preset area, it may wait outside the fault area until receives an instruction for instructing to cancel the prohibition of traffic in the fault area. After receiving the instruction for instructing to cancel the prohibition of traffic in the fault area, it may continue traveling along the originally planned route. Here, since it is not necessary to stop all the automated guided vehicles performing tasks after a fault occurs, a flexible control of the automated guided vehicles performing tasks is realized, and an overall work efficiency is improved. At the same time, since the automated guided vehicles performing tasks are prevented from traveling in the fault area after the fault occurs, the personal safety of the staff handling the faulty vehicle is ensured.

In a scenario, after determining the fault area, the executing body may send the instruction for instructing the prohibition of traffic in the fault area to each non-faulty automated guided vehicle performing a task.

In another scenario, after determining the fault area, the executing body may first query a traveling route of a non-faulty automated guided vehicle performing a task, and send the instruction for instructing the prohibition of traffic in the fault area to the non-faulty automated guided vehicle which needs to travel in the fault area indicated by the traveling route.

Step 203, determining a target automated guided vehicle from automated guided vehicles currently not executing tasks based on the travel status information, and sending a task execution instruction to the target automated guided vehicle.

In the present embodiment, the executing body may determine the target automated guided vehicle from the automated guided vehicles currently not executing tasks based on the travel status information, and send the task execution instruction to the target automated guided vehicle. The task execution instruction includes an instruction for instructing to execute a target task, and the target task is a task that has not been completed by the faulty automated guided vehicle. It should be noted that the task execution instruction may also include other instructions, such as an instruction for instructing the target automated guided vehicle to start.

Here, different target automated guided vehicles may be determined based on different travel statuses. For example, when the travel status is the item-fetching status, an automated guided vehicle with the longest idle time in the automated guided vehicles currently not executing tasks may be determined as the target automated guided vehicle; and when the travel status is the item-delivering status, an automated guided vehicle whose load capacity is the same as that of the above faulty automated guided vehicle in the automated guided vehicles currently not executing tasks may be determined as the target automated guided vehicle.

Therefore, after the automated guided vehicle fails, it is not necessary to manually dispatch a target automated guided vehicle and modify the attributes, which reduces the complexity and difficulty of fault handling, and improves the efficiency of handling a fault event.

Step 204, in response to determining that the faulty automated guided vehicle is transferred to a maintenance area, sending an instruction for instructing to cancel the prohibition of traffic in the fault area to the non-faulty automated guided vehicle executing the task.

In the present embodiment, in response to determining that the faulty automated guided vehicle is transferred to the maintenance area, the executing body may send the instruction for instructing to cancel the prohibition of traffic in the fault area to the non-faulty automated guided vehicle executing the task.

In practice, a traveling non-faulty automated guided vehicle may re-plan the route after receiving the instruction for instructing to cancel the prohibition of traffic in the fault area. A non-faulty automated guided vehicle waiting outside the fault area may continue traveling along the originally planned route after receiving the instruction for instructing to cancel the prohibition of traffic in the fault area. Therefore, it is possible to realize a flexible control of the automated guided vehicles executing tasks, and the overall work efficiency is improved. At the same time, since the normal traffic in the fault area is restored after the fault is cleared, the personal safety of the staff handling the faulty vehicle is ensured.

Figure 3:
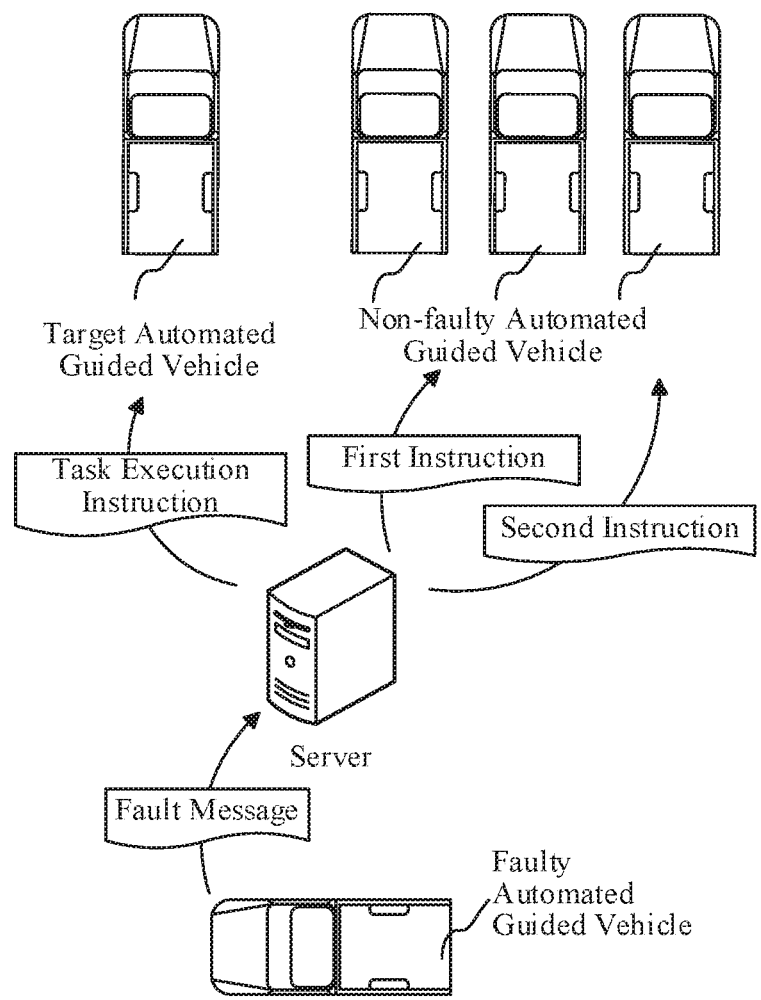
FIG. 3 is a schematic diagram of an application scenario of the method for controlling an automated guided vehicle according to an embodiment of the present disclosure.

With further reference to FIG. 3, FIG. 3 is a schematic diagram of an application scenario of the method for controlling an automated guided vehicle according to the present embodiment. In the application scenario of FIG. 3, after an automated guided vehicle fails (the failed automated guided vehicle is referred to as a faulty automated guided vehicle), the server first receives a fault message sent by the faulty automated guided vehicle. Then, the server determines a fault area based on the location of the fault point, and sends a first instruction for instructing prohibition of traffic in the fault area to the non-faulty automated guided vehicles executing tasks. Then, based on travel status information of the faulty automated guided vehicle, the server determines a target automated guided vehicle from automated guided vehicles currently not executing tasks, and sends a task execution instruction to the target automated guided vehicle, so that the target automated guided vehicle executes the task that has not been completed by the faulty automated guided vehicle. Finally, after the faulty automated guided vehicle is transferred to a maintenance area, the server sends a second instruction for instructing to cancel the prohibition of traffic in the fault area to the non-faulty automated guided vehicles executing tasks.

The method provided by the above embodiment of the present disclosure, first receives the fault message after the automated guided vehicle fails; then determines the fault area based on the location of the fault point, to prohibit the traffic of the non-faulty automated guided vehicle executing a task in the fault area; determines the target automated guided vehicle from the automated guided vehicles currently not executing tasks based on the travel status information of the faulty automated guided vehicle, so that the target automated guided vehicle executes the task that has not been completed by the faulty automated guided vehicle; and finally sends the instruction for instructing to cancel the prohibition of traffic in the fault area to the automated guided vehicles, after the faulty automated guided vehicle is transferred to the maintenance area. Therefore, after the automated guided vehicle fails, it is not necessary to dispatch the target automated guided vehicle and modify the attributes manually, which reduces the complexity and difficulty of fault handling, and improves the efficiency of handling a fault event. At the same time, the automated guided vehicle is controlled to prohibit the traffic in the fault area, and the prohibition of traffic of the automated guided vehicle in the fault area is cancelled, and it is not necessary to stop traveling of the automated guided vehicle executing a task after the fault occurs, realizing a flexible control of the automated guided vehicle performing the task.

Figure 4:
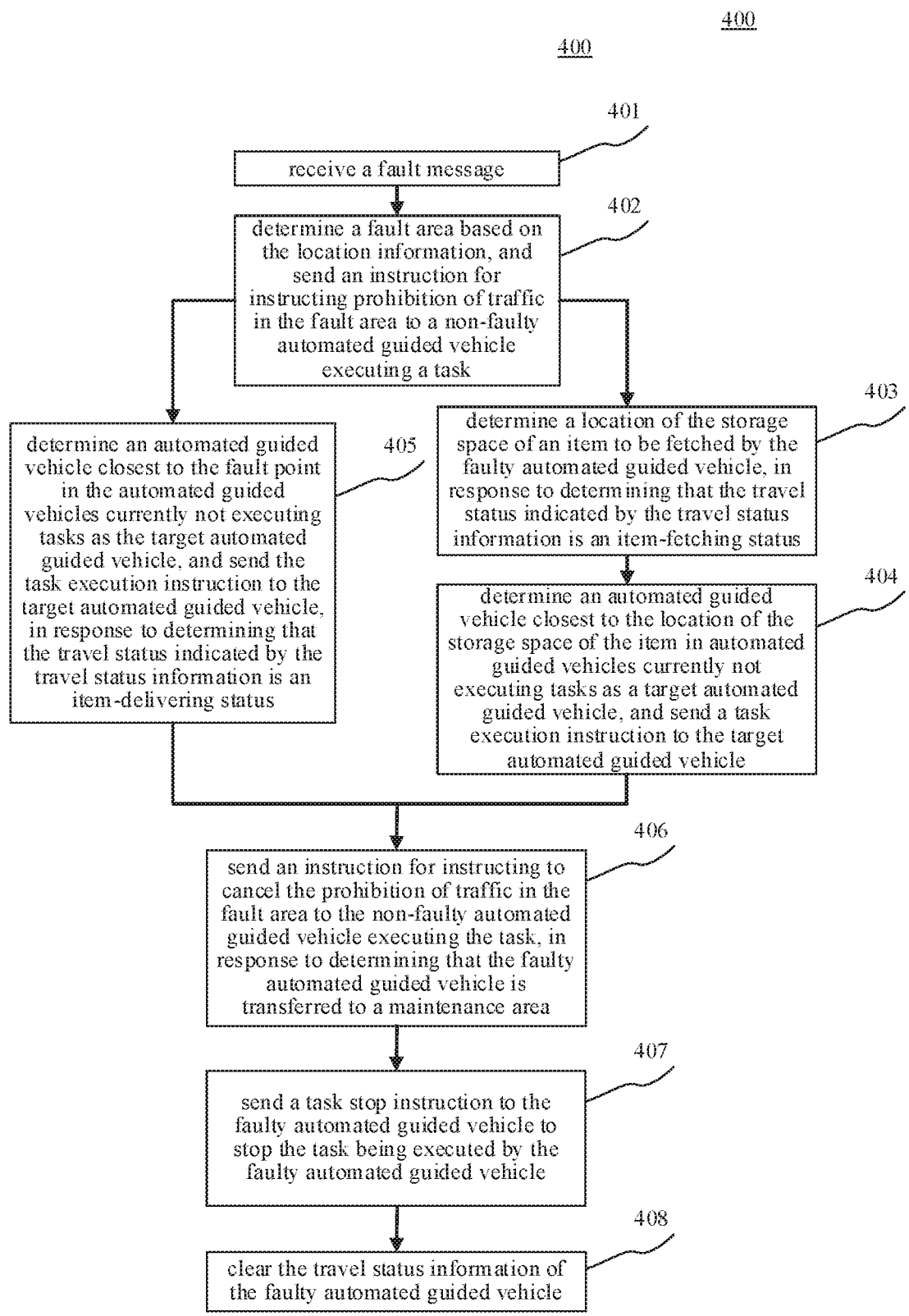
FIG. 4 is a flowchart of a method for controlling an automated guided vehicle according to another embodiment of the present disclosure.

With further reference to FIG. 4, a flow 400 of the method for controlling an automated guided vehicle according to another embodiment is illustrated. The method for controlling an automated guided vehicle includes the following steps:

Step 401, receiving a fault message.

In the present embodiment, the executing body (for example, the server 105 shown in FIG. 1) of the method for controlling an automated guided vehicle may receive the fault message. The fault message may include travel status information for indicating a travel status of a faulty automated guided vehicle and location information of a fault point. Here, the travel status of the faulty vehicle may include, but is not limited to, an item-fetching status and an item-delivering status.

Step 402, determining a fault area based on the location information, and sending an instruction for instructing prohibition of traffic in the fault area to a non-faulty automated guided vehicle performing a task.

In the present embodiment, the executing body may first determine the fault area based on the location information, and then send the instruction for instructing the prohibition of traffic in the fault area to the non-faulty automated guided vehicle performing a task. Here, the executing body may determine the fault area through the following steps. First, a locating point closest to the location of the fault point may be determined, and the locating point may be used as a central locating point. In practice, the locating point may be the center of a two-dimensional code drawn in advance on the ground. Then, a preset range with the central locating point as the center may be determined as the fault area.

Here, since it is not necessary to stop, after a fault occurs, all the automated guided vehicles that are currently performing tasks, a flexible control of the automated guided vehicles that are currently performing tasks is realized, and an overall work efficiency is improved. At the same time, since the automated guided vehicles performing tasks are prevented from traveling in the fault area after the fault occurs, the personal safety of the staff handling the faulty vehicle is ensured.

Step 403, determining a location of the storage space of an item to be fetched by the faulty automated guided vehicle, in response to determining that the travel status indicated by the travel status information is an item-fetching status.

In the present embodiment, in response to determining that the travel status indicated by the travel status information is the item-fetching status, the executing body may determine the location of the storage space of the item to be fetched by the faulty automated guided vehicle. Here, information used to indicate the location of the storage space n may be pre-recorded in the task performed by the faulty automated guided vehicle, and the executing body may directly read the task. After the location of the storage space is determined, step 404 may be performed.

Step 404, determining an automated guided vehicle closest to the location of the storage space in automated guided vehicles currently not executing tasks as a target automated guided vehicle, and sending a task execution instruction to the target automated guided vehicle.

In the present embodiment, the executing body may determine the automated guided vehicle closest to the location of the storage space in the automated guided vehicles currently not executing tasks as the target automated guided vehicle, and send the task execution instruction to the target automated guided vehicle. In this regard, the task execution instruction may include an instruction for instructing to execute a target task, and the target task is a task that has not been completed by the faulty automated guided vehicle. It should be noted that the task execution instruction may also include other instructions, such as an instruction for instructing the target automated guided vehicle to start.

Therefore, in the case of that the automated guided vehicle fails on the way to fetch an item, an automated guided vehicle closest to the location of the storage space and currently being in an idle state is used as the target automated guided vehicle, which may ensure that the uncompleted task of the faulty automated guided vehicle is executed as soon as possible, and the efficiency of fault handling is improved. At the same time, it is not necessary to dispatch the target automated guided vehicle and modify the attributes manually, which reduces the complexity and difficulty of fault handling, and further improves the efficiency of handling a fault event.

Step 405, determining an automated guided vehicle closest to the fault point in the automated guided vehicles currently not executing tasks as the target automated guided vehicle, and sending the task execution instruction to the target automated guided vehicle, in response to determining that the travel status indicated by the travel status information is an item-delivering status.

In the present embodiment, in response to determining that the travel status indicated by the travel status information is the item-delivering status, the executing body may determine the automated guided vehicle closest to the fault point in the automated guided vehicles currently not executing tasks as the target automated guided vehicle, and send the task execution instruction to the target automated guided vehicle. The task execution instruction may include an instruction for instructing traveling to the location of the fault point and the instruction for instructing to execute the target task, and the target task is the task that has not been completed by the faulty automated guided vehicle. It should be noted that the task execution instruction may also include other instructions, such as an instruction for instructing the target automated guided vehicle to start.

Therefore, in the case of that the automated guided vehicle fails on the way to deliver an item, the automated guided vehicle closest to the fault point and currently being in an idle state is used as the target automated guided vehicle, which may ensure that the uncompleted task of the faulty automated guided vehicle is performed as soon as possible, and the efficiency of fault handling is improved. At the same time, it is not necessary to dispatch the target automated guided vehicle and modify the attribute manually s, which reduces the complexity and difficulty of fault handling, and further improves the efficiency of handling a fault event.

In practice, after the automated guided vehicle fails on the way to deliver the item, and sends the instruction for instructing the prohibition of traffic in the fault area to a non-faulty automated guided vehicle executing a task, the staff may place the item carried by the faulty automated guided vehicle on the ground at the current location (that is, the fault point), and then push the faulty automated guided vehicle to a maintenance area. Therefore, sending the Instruction for instructing the prohibition of traffic in the fault area to the non-faulty automated guided vehicle performing a task may also prevent other automated guided vehicles carrying items from colliding with the item placed on the ground, ensuring the safety of the other automated guided vehicles carrying the items.

Step 406, sending an instruction for instructing to cancel the prohibition of traffic in the fault area to the non-faulty automated guided vehicle executing the task, in response to determining that the faulty automated guided vehicle is transferred to a maintenance area.

In the present embodiment, in response to determining that the faulty automated guided vehicle is transferred to the maintenance area, the executing body may send the instruction for instructing to cancel the prohibition of traffic in the fault area to the non-faulty automated guided vehicle executing the task.

In practice, a traveling non-faulty automated guided vehicle may re-plan the route after receiving the instruction for instructing to cancel the prohibition of traffic in the fault area. A non-faulty automated guided vehicle waiting outside the fault area may continue traveling along the originally planned route after receiving the instruction for instructing to cancel the prohibition of traffic in the fault area. Therefore, it is possible to realize a flexible control of the automated guided vehicles executing the tasks, and an overall work efficiency is improved. At the same time, since the normal traffic in the fault area is restored after the fault is cleared, the personal safety of the staff handling the faulty vehicle is ensured.

Step 407, sending a task stop instruction to the faulty automated guided vehicle to stop the task being performed by the faulty automated guided vehicle.

In the present embodiment, after sending the task execution instruction to the target automated guided vehicle, the executing body may also send the task stop instruction to the faulty automated guided vehicle to stop the task being performed by the faulty automated guided vehicle.

Step 408, clearing the travel status information of the faulty automated guided vehicle.

In the present embodiment, after sending the task execution instruction to the target automated guided vehicle, the executing body may also clear the travel status information of the faulty automated guided vehicle.

It should be noted that the performing order of step 406 to step 408 is not limited to the order indicated by the above sequence number, and may also be performed in other orders. For example, step 406, step 407, and step 408 may be performed simultaneously; or, step 408, step 407, and step 406 may be performed in sequence.

It can be seen from FIG. 4 that, compared with the embodiment corresponding to FIG. 2, the flow 400 of the method for controlling an automated guided vehicle in the present embodiment highlights the step of determining a target automated guided vehicle based on the item-fetching status and the item-delivering status respectively. Therefore, the solution described in the present embodiment may ensure that the uncompleted task of the fault automated guided vehicle is executed as soon as possible, which further improves the efficiency of fault handling.

Figure 5:
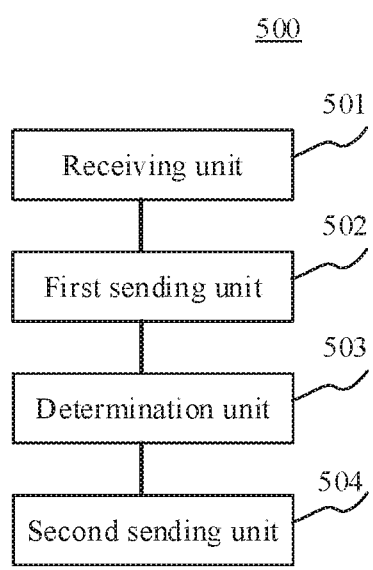
FIG. 5 is a schematic structural diagram of an apparatus for controlling an automated guided vehicle according to an embodiment of the present disclosure.

With further reference to FIG. 5, as an implementation of the method shown in the above figures, embodiments of the present disclosure provide an apparatus for controlling an automated guided vehicle, and the apparatus embodiments correspond to the method embodiments as shown in FIG. 2, and the apparatus may be specifically applied to various electronic devices.

As shown in FIG. 5, the apparatus 500 for controlling an automated guided vehicle of the present embodiment includes: a receiving unit 501, configured to receive a fault message, the fault message includes travel status information for indicating a travel status of a faulty automated guided vehicle and location information of a fault point where the fault occurs; a first sending unit 502, configured to determine a fault area based on the location information, and send an instruction for instructing prohibition of traffic in the fault area to a non-faulty automated guided vehicle executing a task; a determination unit 503, configured to determine a target automated guided vehicle from automated guided vehicles currently not executing tasks based on the travel status information, and send a task execution instruction to the target automated guided vehicle, the task execution instruction including an instruction for instructing to execute a target task, and the target task being a task that has not been completed by the faulty automated guided vehicle; and a second sending unit 504, configured to send an instruction for instructing to cancel the prohibition of traffic in the fault area to the non-faulty automated guided vehicle executing the task, in response to determining that the faulty automated guided vehicle is transferred to a maintenance area.

In some alternative implementations of the present embodiment, the determination unit 503 may include: a determination module and a first sending module (not shown in the figure). The determination module may be configured to determine the location of the storage space of an item to be fetched by the faulty automated guided vehicle, in response to determining that the travel status indicated by the travel status information is an item-fetching status. The first sending module is configured to determine an automated guided vehicle closest to the location of the storage space in the automated guided vehicles currently not executing tasks as the target automated guided vehicle, and send the task execution instruction to the target automated guided vehicle, where the task execution instruction includes the instruction for instructing to perform the target task, and the target task is the task that has not been completed by the faulty automated guided vehicle.

In some alternative implementations of the present embodiment, the determination unit 503 may include: a second sending module (not shown in the figure). The second sending module may be configured to determine an automated guided vehicle closest to the fault point in the automated guided vehicles currently not executing tasks as the target automated guided vehicle, and send the task execution instruction to the target automated guided vehicle, in response to determining that the travel status indicated by the travel status information is an item-delivering status, where the task execution instruction includes an instruction for instructing traveling to the location of the fault point and the instruction for instructing to perform the target task, and the target task is the task that has not been completed by the faulty automated guided vehicle.

In some alternative implementations of the present embodiment, the apparatus may further include a third sending unit (not shown in the figure). The third sending unit may be configured to send a task stop instruction to the faulty automated guided vehicle to stop the task being performed by the faulty automated guided vehicle.

In some alternative implementations of the present embodiment, the apparatus may further include a setting unit (not shown in the figure). The setting unit may be configured to clear the travel status information of the faulty automated guided vehicle.

The apparatus provided by the above embodiment of the present disclosure, the receiving unit 501 receives the fault message after the automated guided vehicle fails; then the first sending unit 502 determines the fault area based on the location of the fault point, sends the instruction for instructing the prohibition of traffic in the fault area to a non-faulty automated guided vehicle executing a task; the determination unit 503 determines a target automated guided vehicle from the automated guided vehicles currently not executing tasks, based on the travel status information of the faulty automated guided vehicle, so that the target automated guided vehicle performs the task that has not been completed by the faulty automated guided vehicle; and finally the second sending unit 504 sends the instruction for instructing to cancel the prohibition of traffic in the fault area to the automated guided vehicle, after the faulty automated guided vehicle is transferred to the maintenance area. Therefore, after the automated guided vehicle fails, it is not necessary to dispatch the target automated guided vehicle and modify the attributes manually, which reduces the complexity and difficulty of fault handling, and improves the efficiency of handling a fault event. At the same time, the prohibit automated guided vehicle from traveling in the fault area, and canceling the prohibition of traffic of the automated guided vehicle in the fault area is controlled, and it is not necessary to stop traveling of the automated guided vehicle executing a task after the fault occurs, realizing a flexible control of the automated guided vehicle performing the task.

Figure 6:
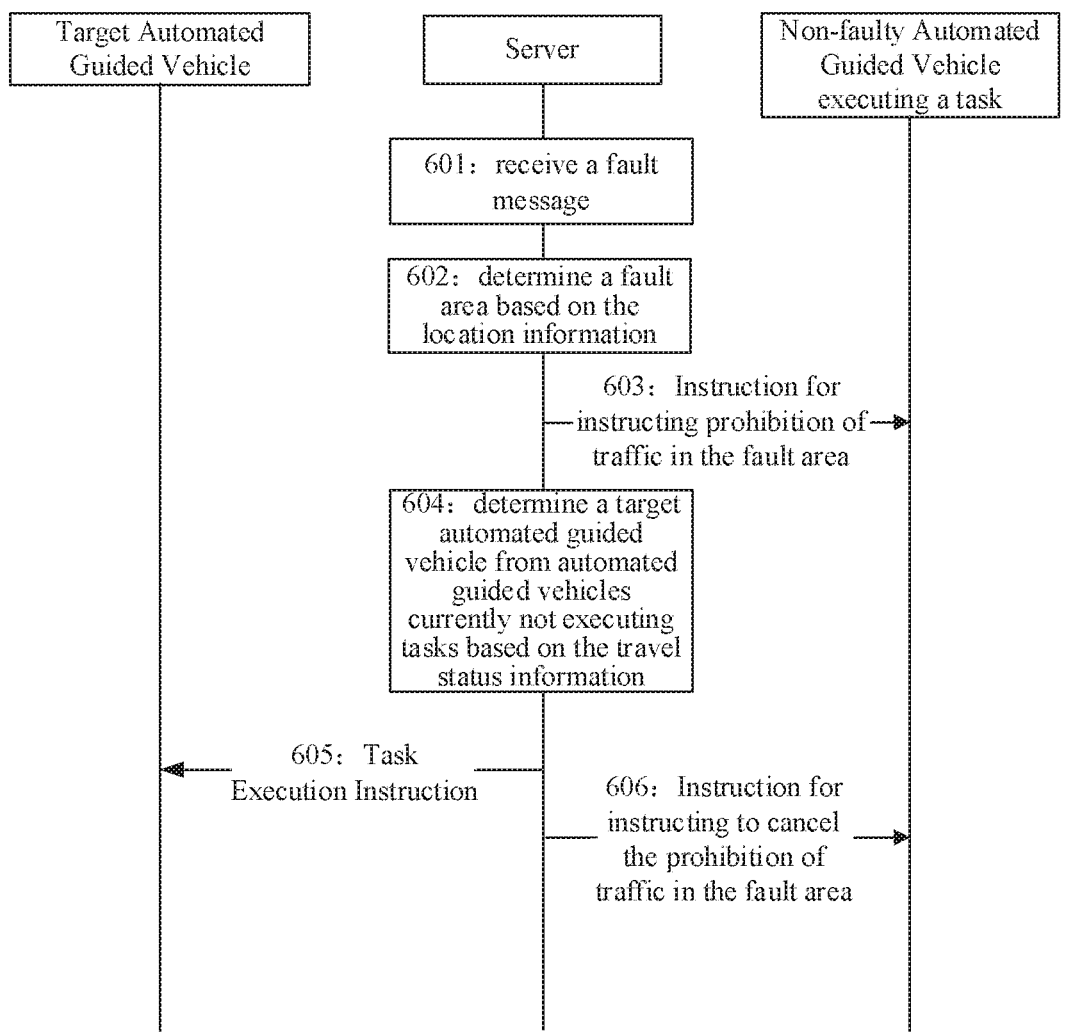
FIG. 6 is a schematic diagram of an interaction process between apparatuses in a system for controlling an automated guided vehicle according to an embodiment of the present disclosure.

With further reference to FIG. 6, a schematic diagram 600 of an interaction process between apparatuses in a system for controlling an automated guided vehicle according to an embodiment of the present disclosure is illustrated.

The system for controlling an automated guided vehicle includes a server and at least one automated guided vehicle, each of the at least one automated guided vehicle is in communication connection with the server.

As shown in FIG. 6, in the system for controlling an automated guided vehicle, the interaction process 600 between the apparatuses may include the following steps:

Step 601, the server receives a fault message.

In the present embodiment, the server may receive the fault message. The fault message includes travel status information for indicating a travel status of a faulty automated guided vehicle in the at least one automated guided vehicle and location information of a fault point where the fault occurs. The fault message may be sent to the server after the fault automated guided vehicle detects its own abnormality.

In some alternative implementations of the present embodiment, the system for controlling an automated guided vehicle may further include a terminal device. The terminal device may be in communication connection with the server. The terminal device may be configured to send the fault message to the server. In practice, when the faulty automated guided vehicle cannot detect its own abnormality or the faulty automated guided vehicle cannot send fault message, the terminal device may send the fault message.

Step 602, the server determines a fault area based on the location information.

Step 603, a non-faulty automated guided vehicle performing a task in the at least one automated guided vehicle receives an instruction for instructing prohibition of traffic in the fault area sent by the server.

Step 604, the server determines a target automated guided vehicle from automated guided vehicles currently not executing a task based on the travel status information.

Step 605, the server sends a task execution instruction to the target automated guided vehicle.

In the present embodiment, the task execution instruction may include an instruction for instructing to perform a target task, and the target task is a task that has not been completed by the faulty automated guided vehicle.

In some alternative implementations of the present embodiment, the server may first determine the location of the storage space of an item to be fetched by the faulty automated guided vehicle, in response to determining that the travel status indicated by the travel status information is an item-fetching status; then may determine an automated guided vehicle closest to the location of the storage space in the automated guided vehicles currently not executing tasks as the target automated guided vehicle, and send the task execution instruction to the target automated guided vehicle. The task execution instruction includes the instruction for instructing to execute the target task, and the target task is the task that has not been completed by the faulty automated guided vehicle.

In some alternative implementations of the present embodiment, the server may determine an automated guided vehicle closest to the fault point in the automated guided vehicles currently not executing tasks as the target automated guided vehicle, and send the task execution instruction to the target automated guided vehicle, in response to determining that the travel status indicated by the travel status information is an item-delivering status. The task execution instruction includes an instruction for instructing traveling to a location of the fault point and the instruction for instructing to execute the target task, and the target task is the task that has not been completed by the faulty automated guided vehicle.

Step 606, the server sends an instruction for instructing to cancel the prohibition of traffic in the fault area to the non-faulty automated guided vehicle executing task, in response to determining that the faulty automated guided vehicle is transferred to a maintenance area.

In some alternative implementations of the present embodiment, after sending the task execution instruction to the target automated guided vehicle, the server may further send a task stop instruction to the faulty automated guided vehicle to stop the task being performed by the faulty automated guided vehicle.

In some alternative implementations of the present embodiment, after sending the task execution instruction to the target automated guided vehicle, the server may further clear the travel status information of the faulty automated guided vehicle.

The method, apparatus and system for controlling an automated guided vehicle provided by embodiments of the present disclosure, the server may first receive the fault message after the automated guided vehicle fails; then determine the fault area based on the location of the fault point, to prohibit the traffic of the non-faulty automated guided vehicle executing a task in the fault area; determine the target automated guided vehicle from the automated guided vehicles currently not executing tasks, based on the travel status information of the faulty automated guided vehicle, so that the target automated guided vehicle executes the task that has not been completed by the faulty automated guided vehicle; and finally send the instruction for instructing to cancel the prohibition of traffic in the fault area to the automated guided vehicle, after the faulty automated guided vehicle is transferred to the maintenance area. Therefore, after the automated guided vehicle fails, it is not necessary to dispatch the target automated guided vehicle and modify the attributes manually, which reduces the complexity and difficulty of fault handling, and improves the efficiency of handling a fault event. At the same time, the automated guided vehicle is controlled to prohibit the traffic in the fault area, and the prohibition of traffic of the automated guided vehicle in the fault area is cancelled, and it is not necessary to stop traveling of the automated guided vehicle executing a task after the fault occurs, realizing a flexible control of the automated guided vehicle performing the task.

Figure 7:
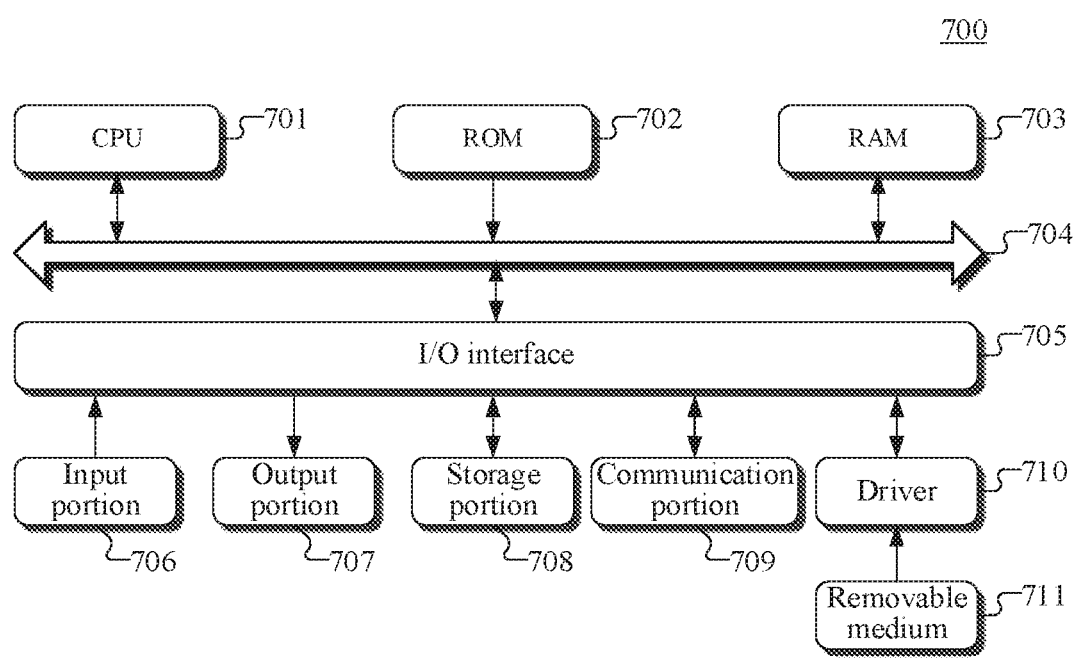
FIG. 7 is a schematic structural diagram of a computer system of a server suitable for implementing embodiments of the present disclosure.

With further reference to FIG. 7, a schematic structural diagram of a computer system 700 of a server suitable for implementing embodiments of the present disclosure is shown. The server shown in FIG. 7 is merely an example, and should not impose any limitation on the function and scope of use of embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including such as a keyboard, a mouse; an output portion 707 including such as a cathode ray tube (CRT), a liquid crystal display (LCD) and a speaker; the storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710 as needed, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 709, or may be installed from the removable medium 711. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium.

The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in embodiments of the present disclosure may be implemented by means of software or hardware. The described units may also be provided in a processor, for example, maybe described as: a processor including a receiving unit, a first sending unit, a determination unit and a second sending unit. Here, the names of these units do not in some cases constitute limitations to such units themselves. For example, the receiving unit may also be described as "a unit configured to receive a fault message".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: receive a fault message, the fault message includes travel status information for indicating a travel status of a faulty automated guided vehicle and location information of a fault point where a fault occurs; determine a fault area based on the location information, and send an instruction for instructing prohibition of traffic in the fault area to a non-faulty automated guided vehicle executing a task; determine a target automated guided vehicle from automated guided vehicles currently not executing tasks based on the travel status information, and send a task execution instruction to the target automated guided vehicle; and send an instruction for instructing to cancel the prohibition of traffic in the fault area to the non-faulty automated guided vehicle executing a task, in response to determining that the faulty automated guided vehicle is transferred to a maintenance area.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling an automated guided vehicle, comprising:
    receiving a fault message by a processor, the fault message comprising travel status information for indicating a travel status of a faulty automated guided vehicle and location information of a fault point, wherein a fault occurs to the faulty automated guided vehicle at a location of the fault point;
    determining, by the processor, a preset range as a fault area based on the location information, the preset range comprising a plurality of locating points surrounding a locating point closest to the location of the fault point as a center, and sending by the processor an instruction for instructing prohibition of traffic in the fault area to a non-faulty automated guided vehicle executing a task;
    determining, by the processor, a target automated guided vehicle from automated guided vehicles currently not executing tasks based on the travel status information, and sending a task execution instruction to the target automated guided vehicle, the task execution instruction comprising an instruction for instructing to execute a target task, and the target task being a task that has not been completed by the faulty automated guided vehicle; and
    in response to determining that the faulty automated guided vehicle is transferred to a maintenance area, sending, by the processor, an instruction for instructing to cancel the prohibition of traffic in the fault area to the non-faulty automated guided vehicle executing the task.

2. The method for controlling an automated guided vehicle according to claim 1, wherein, the determining the target automated guided vehicle from the automated guided vehicles currently not executing tasks based on the travel status information, and sending the task execution instruction to the target automated guided vehicle, comprises:
    in response to determining that the travel status indicated by the travel status information is an item-fetching status, determining a location of a storage space of an item to be fetched by the faulty automated guided vehicle; and
    determining an automated guided vehicle closest to the location of the storage space of the item in the automated guided vehicles currently not executing tasks as the target automated guided vehicle, and sending the task execution instruction to the target automated guided vehicle, wherein the task execution instruction comprises the instruction for instructing to execute the target task, and the target task is the task that has not been completed by the faulty automated guided vehicle.

3. The method for controlling an automated guided vehicle according to claim 1, wherein, the determining the target automated guided vehicle from the automated guided vehicles currently not executing tasks based on the travel status information, and sending the task execution instruction to the target automated guided vehicle, comprises:
    in response to determining that the travel status indicated by the travel status information is an item-delivering status, determining an automated guided vehicle closest to the fault point in the automated guided vehicles currently not executing tasks as the target automated guided vehicle, and sending the task execution instruction to the target automated guided vehicle, wherein the task execution instruction comprises an instruction for instructing driving to a location of the fault point and the instruction for instructing to execute the target task, and the target task is the task that has not been completed by the faulty automated guided vehicle.

4. The method for controlling an automated guided vehicle according to claim 1, wherein, after sending the task execution instruction to the target automated guided vehicle, the method further comprises:
   sending a task stop instruction to the faulty automated guided vehicle to stop the task being performed by the faulty automated guided vehicle.

5. The method for controlling an automated guided vehicle according to claim 1, wherein, after sending the task execution instruction to the target automated guided vehicle, the method further comprises:
   clearing the travel status information of the faulty automated guided vehicle.

6. An apparatus for controlling an automated guided vehicle, comprising:
   at least one processor; and
   a memory storing instructions, wherein the instructions, when executed by the at least one processor, cause the at least one processor to perform operations, the operations comprising:
   receiving a fault message, the fault message comprising travel status information for indicating a travel status of a faulty automated guided vehicle and location information of a fault point, wherein a fault occurs to the faulty automated guided vehicle at a location of the fault point;
   determining a preset range as a fault area based on the location information, the preset range comprising a plurality of locating points surrounding a locating point closest to the location of the fault point as a center, and sending an instruction for instructing prohibition of traffic in the fault area to a non-faulty automated guided vehicle executing a task;
   determining a target automated guided vehicle from automated guided vehicles currently not executing tasks based on the travel status information, and sending a task execution instruction to the target automated guided vehicle, the task execution instruction comprising an instruction for instructing to execute a target task, and the target task being a task that has not been completed by the faulty automated guided vehicle; and
   sending an instruction for instructing to cancel the prohibition of traffic in the fault area to the non-faulty automated guided vehicle executing the task, in response to determining that the faulty automated guided vehicle is transferred to a maintenance area.

7. The apparatus for controlling an automated guided vehicle according to claim 6, wherein the determining the target automated guided vehicle from the automated guided vehicles currently not executing tasks based on the travel status information, and sending the task execution instruction to the target automated guided vehicle, comprises:
   determining a location of a storage space of an item to be fetched by the faulty automated guided vehicle, in response to determining that the travel status indicated by the travel status information is an item-fetching status; and
   determining an automated guided vehicle closest to the location of the storage space of the item in the automated guided vehicles currently not executing tasks as the target automated guided vehicle, and sending the task execution instruction to the target automated guided vehicle, wherein the task execution instruction comprises the instruction for instructing to execute the target task, and the target task is the task that has not been completed by the faulty automated guided vehicle.

8. The apparatus for controlling an automated guided vehicle according to claim 6, wherein the determining the target automated guided vehicle from the automated guided vehicles currently not executing tasks based on the travel status information, and sending the task execution instruction to the target automated guided vehicle comprises:
   determining an automated guided vehicle closest to the fault point in the automated guided vehicles currently not executing tasks as the target automated guided vehicle, and sending the task execution instruction to the target automated guided vehicle, in response to determining that the travel status indicated by the travel status information is an item-delivering status, wherein the task execution instruction comprises an instruction for instructing driving to a location of the fault point and the instruction for instructing to execute the target task, and the target task is the task that has not been completed by the faulty automated guided vehicle.

9. The apparatus for controlling an automated guided vehicle according to claim 6, wherein the operations further comprise:
   sending a task stop instruction to the faulty automated guided vehicle to stop the task being performed by the faulty automated guided vehicle.

10. The apparatus for controlling an automated guided vehicle according to claim 6, wherein the operations further comprise:
    clearing the travel status information of the faulty automated guided vehicle.

11. A system for controlling an automated guided vehicle, the system comprising a server and at least one automated guided vehicle, each of the at least one automated guided vehicle being in communication connection with the server;
    the server, being configured to receive a fault message, determine a preset range as a fault area based on location information of a fault point, a fault of a faulty automated guided vehicle in the at least one automated guided vehicle occurred at a location of the fault point, the fault message comprising travel status information for indicating a travel status of the faulty automated guided vehicle and the location of the fault point, the preset range comprising a plurality of locating points surrounding a locating point closest to the location of the fault point as a center;
    a non-faulty automated guided vehicle being executing a task, being configured to receive an instruction for instructing prohibition of traffic in the fault area sent by the server; and
    the server, being further configured to determine a target automated guided vehicle from automated guided vehicles currently not executing tasks based on the travel status information, and send a task execution instruction to the target automated guided vehicle, the task execution instruction comprising an instruction for instructing to execute a target task, and the target task being a task that has not been completed by the faulty automated guided vehicle, and send an instruction for instructing to cancel the prohibition of traffic in the fault area to the non-faulty automated guided vehicle executing the task, in response to determining that the faulty automated guided vehicle is transferred to a maintenance area.

12. The system for controlling an automated guided vehicle according to claim 11, wherein the system further comprises a terminal device, and the terminal device is in communication connection with the server; and the terminal device, is configured to send the fault message to the server, wherein the fault message comprises the travel status information for indicating the travel status of the faulty automated guided vehicle and the location information of the fault point where the fault occurs.

13. The system for controlling an automated guided vehicle according to claim 11, wherein the server is further configured to:

determine a location of a storage space of an item to be fetched by the faulty automated guided vehicle, in response to determining that the travel status indicated by the travel status information is an item-fetching status; and determine an automated guided vehicle closest to the location of the storage space of the item in the automated guided vehicles currently not executing tasks as the target automated guided vehicle, and send the task execution instruction to the target automated guided vehicle, wherein the task execution instruction comprises the instruction for instructing to execute the target task, and the target task is the task that has not been completed by the faulty automated guided vehicle.

14. The system for controlling an automated guided vehicle according to claim 11, wherein the server is further configured to:

in response to determining that the travel status indicated by the travel status information is an item-delivering status, determine an automated guided vehicle closest to the fault point in the automated guided vehicles currently not executing tasks as the target automated guided vehicle, and send the task execution instruction to the target automated guided vehicle, wherein the task execution instruction comprises an instruction for instructing driving to a location of the fault point and the instruction for instructing to execute the target task, and the target task is the task that has not been completed by the faulty automated guided vehicle.

15. The system for controlling an automated guided vehicle according to claim 11, wherein the server is further configured to:

send a task stop instruction to the faulty automated guided vehicle to stop the task being performed by the faulty automated guided vehicle, after sending the task execution instruction to the target automated guided vehicle.

16. The system for controlling an automated guided vehicle according to claim 11, wherein the server is further configured to:

clear the travel status information of the faulty automated guided vehicle.

17. A non-transitory computer readable medium, storing a computer program thereon, the program, when executed by a processor, implements the method according to claim 1.

* * * * *